United States Patent
Meng

(10) Patent No.: US 9,832,636 B2
(45) Date of Patent: Nov. 28, 2017

(54) METHOD, DEVICE AND SYSTEM FOR DETERMINING WORKING MODE OF DATA CARD TYPE TERMINAL

(71) Applicant: ZTE Corporation, Shenzhen (CN)

(72) Inventor: Xiangyu Meng, Shenzhen (CN)

(73) Assignee: XI'AN ZHONGXING NEW SOFTWARE CO. LTD., Xi'an (CN)

(*) Notice: Subject to any disclaimer, the term of this patent is extended or adjusted under 35 U.S.C. 154(b) by 293 days.

(21) Appl. No.: 14/430,966

(22) PCT Filed: Jul. 26, 2013

(86) PCT No.: PCT/CN2013/080238
§ 371 (c)(1),
(2) Date: Mar. 25, 2015

(87) PCT Pub. No.: WO2013/178173
PCT Pub. Date: Dec. 5, 2013

(65) Prior Publication Data
US 2015/0256997 A1    Sep. 10, 2015

(30) Foreign Application Priority Data
Aug. 20, 2012  (CN) .......................... 2012 1 0295682

(51) Int. Cl.
*H04W 4/00* (2009.01)
*H04W 8/22* (2009.01)
(Continued)

(52) U.S. Cl.
CPC ........... *H04W 8/22* (2013.01); *H04L 41/0806* (2013.01); *H04W 76/02* (2013.01); *H04W 88/06* (2013.01)

(58) Field of Classification Search
None
See application file for complete search history.

(56) References Cited

U.S. PATENT DOCUMENTS

2004/0225918 A1  11/2004  Fruhauf
2006/0109349 A1   5/2006  Takashima
(Continued)

FOREIGN PATENT DOCUMENTS

CN   102204231 A    9/2011
CN   102231878 A   11/2011
(Continued)

OTHER PUBLICATIONS

International Search Report for corresponding application PCT/CN2013/080238 filed Jul. 26, 2013; dated Oct. 24, 2013.
(Continued)

*Primary Examiner* — Shantell L Heiber
(74) *Attorney, Agent, or Firm* — Cantor Colburn LLP

(57) ABSTRACT

Provided are a method, device and system for determining a working mode of a data card type terminal. In the method, when a data card type terminal is connected to a wireless AP/CPE or PC, the data card type terminal determines whether a working mode request from the wireless AP/CPE is received; if so, sets a working mode of the data card type terminal to a wireless AP/CPE working mode; otherwise, sets the working mode of the data card type terminal to a PC working mode. In the solution, when the data card type terminal is connected to the wireless AP/CPE or PC, the data card type terminal determines whether a working mode request from the wireless AP/CPE exists, if so, sets a working mode of the data card type terminal to an AP/CPE working mode, while if not, sets the working mode of the data card type terminal to a PC working mode, so that the data card type terminal can automatically adjust, through interaction with the PC or wireless AP/CPE device, the working mode according to different working environments without manual interference of a user.

16 Claims, 5 Drawing Sheets

(51) Int. Cl.
*H04W 88/06* (2009.01)
*H04W 76/02* (2009.01)
*H04L 12/24* (2006.01)

(56) References Cited

U.S. PATENT DOCUMENTS

| | | | |
|---|---|---|---|
| 2009/0065571 A1* | 3/2009 | Jain | G06K 19/07739 235/379 |
| 2009/0307380 A1 | 12/2009 | Lee et al. | |
| 2009/0325500 A1 | 12/2009 | Kawakita | |
| 2011/0158217 A1* | 6/2011 | Meng | H04L 12/4633 370/338 |

FOREIGN PATENT DOCUMENTS

| CN | 102323892 A | 1/2012 |
|---|---|---|
| CN | 102385557 A | 3/2012 |
| CN | 102411546 A | 4/2012 |

OTHER PUBLICATIONS

Supplementary European Search Report Application No. EP13796609; dated Dec. 21, 2015; pp. 8.

\* cited by examiner

METHOD, DEVICE AND SYSTEM FOR DETERMINING WORKING MODE OF DATA CARD TYPE TERMINAL

TECHNICAL FIELD

The disclosure relates to the field of communications, and in particular, to a method, device and system for determining a working mode of a data card type terminal.

BACKGROUND

Wireless customer premise equipment (CPE) is wireless terminal access equipment receiving wireless fidelity (WiFi) signals. The wireless CPE can replace wireless customer premise equipment such as a wireless network card and can receive wireless signals sent from a wireless router, a wireless access point (AP), a wireless base station, etc. The wireless CPE, as a new type of wireless terminal access equipment, is widely used in wireless network access in the countryside, towns, hospitals, units, factories, cells, etc.

A wireless AP is a wireless switch for a wireless network and is also the core of the wireless network. The wireless AP, as an access point for mobile computer users to access a wired network, is mainly used inside broadband homes, buildings and parks. The wireless AP has a typical coverage distance of from a few tens of metres to hundreds of metres. At present, the main techniques of the wireless AP are 802.11 series. Most of wireless APs also have an access point (AP) client mode by which the APs can perform wireless connection with other APs so as to extend the coverage range of the network.

In the related technologies, a data card type terminal can exchange data with a personal computer (PC) and can also exchange data with wireless CPE/AP type equipment. However, the data card type terminal is unable to automatically identify whether it is exchanging data with the PC or the wireless CPE/AP type equipment, the data card type terminal is unable to automatically adjust its working mode to work in a normal working state.

SUMMARY

The embodiments of the disclosure provide a method, device and system for determining the working mode of a data card type terminal, so as to at least solve the problem that, in the related technologies, the data card type terminal is unable to automatically identify whether it is exchanging data with a PC or wireless CPE/AP type equipment, the data card type terminal is unable to automatically adjust its working mode to work in a normal working state.

According to one embodiment of the disclosure, provided is a method for determining the working mode of a data card type terminal, the method including: when the data card type terminal is connected to a wireless AP/CPE or a PC, judging, by the data card type terminal, whether a working mode request from the wireless AP/CPE is received; if the working mode request from the wireless AP/CPE is received, setting the working mode of the data card type terminal to be a wireless AP/CPE working mode; and if the working mode request from the wireless AP/CPE is not received, setting the working mode of the data card type terminal to be a PC working mode.

In an example embodiment, after setting the working mode of the data card type terminal to be the wireless AP/CPE working mode, the above-mentioned method further includes: reporting, by the data card type terminal, to the wireless AP/CPE a combination of ports used during cooperative work with the wireless AP/CPE; and receiving, by the data card type terminal, a configuration management command from the wireless AP/CPE, and executing, by the data card type terminal, an operation corresponding to the configuration management command.

In an example embodiment, before receiving, by the data card type terminal, the configuration management command from the wireless AP/CPE, the above-mentioned method further includes: identifying, by the wireless AP/CPE, the received combination of ports; and sending, by the wireless AP/CPE, the configuration management command to the data card type terminal.

In an example embodiment, the combination of ports used during cooperative work with the wireless AP/CPE includes: an Ethernet control model (ECM) interface, a Qualcomm modem interface (QMI), an ECM+AT.

In an example embodiment, after setting the working mode of the data card type terminal to be the PC working mode, the above-mentioned method further includes: reporting, by the data card type terminal, to the PC a combination of ports used during cooperative work with the PC; and receiving, by the data card type terminal, a configuration management command from the PC, and executing, by the data card type terminal, an operation corresponding to the configuration management command.

In an example embodiment, before receiving, by the data card type terminal, the configuration management command from the PC, the above-mentioned method further includes: identifying, by the PC, the received combination of ports; and sending, by the PC, the configuration management command to the data card type terminal.

In an example embodiment, the combination of ports used during cooperative work with the PC includes: a remote network driver interface specification (RNDIS), a network drive interface specification (NDIS)+AT+Diagnostic.

In an example embodiment, the above-mentioned configuration management command includes: current network state query, access point name (APN) setting, short message, connection, disconnection.

In an example embodiment, before judging, by the data card type terminal, whether the working mode request from the wireless AP/CPE is received, the above-mentioned method further includes: detecting, by the wireless AP/CPE, connection with the data card type terminal; and sending, by the wireless AP/CPE, the working mode request to the data card type terminal.

In an example embodiment, the above-mentioned working mode request is a universal serial bus (USB) request.

According to another embodiment of the disclosure, provided is a device for determining the working mode of a data card type terminal which is applied to a data card type terminal, including: a judgement component configured to judge, when a data card type terminal is connected to a wireless AP/CPE or a PC, whether a working mode request from the wireless AP/CPE is received; a first setting component configured to set, in a condition that a judgement result is that the working mode request from the wireless AP/CPE is received, the working mode of the data card type terminal to be a wireless AP/CPE working mode; and a second setting component configured to set, in a condition that the judgement result is that the working mode request from the wireless AP/CPE is not received, the working mode of the data card type terminal to be a PC working mode.

In an example embodiment, the above-mentioned device further includes: a report component configured to report, in a condition that the working mode of the data card type terminal is the wireless AP/CPE working mode, a combination of ports used during cooperative work with the wireless AP/CPE to the wireless AP/CPE, or to report, in a condition that the working mode of the data card type terminal is the PC working mode, a combination of ports used during cooperative work with the PC to the PC; a receiving component configured to receive a configuration management command from the wireless AP/CPE or the PC; and an execution component configured to execute an operation corresponding to the configuration management command.

According to still another embodiment of the disclosure, provided is a system for determining the working mode of a data card type terminal, including: a data card type terminal, a wireless AP/CPE or a PC, wherein the data card type terminal includes the device for determining the working mode of the data card type terminal described in any one of the above embodiments; the wireless AP/CPE includes: a first identification component configured to identify received combination of ports; and a first sending component configured to send a configuration management command to the data card type terminal; and the PC includes: a second identification component configured to identify received combination of ports; and a second sending component configured to send a configuration management command to the data card type terminal.

In an example embodiment, the above-mentioned wireless AP/CPE further includes: a detection component configured to detect connection with the data card type terminal; and a third sending component configured to send a working mode request to the data card type terminal.

By means of the embodiments of the disclosure, when a data card type terminal is connected to a wireless AP/CPE or PC, it is judged whether a working mode request from the wireless AP/CPE is received or not; if the working mode request from the wireless AP/CPE is received, the working mode of the data card type terminal is set to be an AP/CPE working mode; otherwise, the working mode of the data card type terminal is set to be a PC working mode. By virtue of the above solution, the data card type terminal is able to automatically adjust, through interaction with the PC or wireless AP/CPE equipment, the working mode according to different working environments without user's manual interference, i.e. a normal working state can be achieved.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

Note that, the embodiments of the disclosure and the features of the embodiments can be combined with each other if there is no conflict. The disclosure will be explained below with reference to the drawings and in conjunction with the embodiments in detail.

Figure 1:
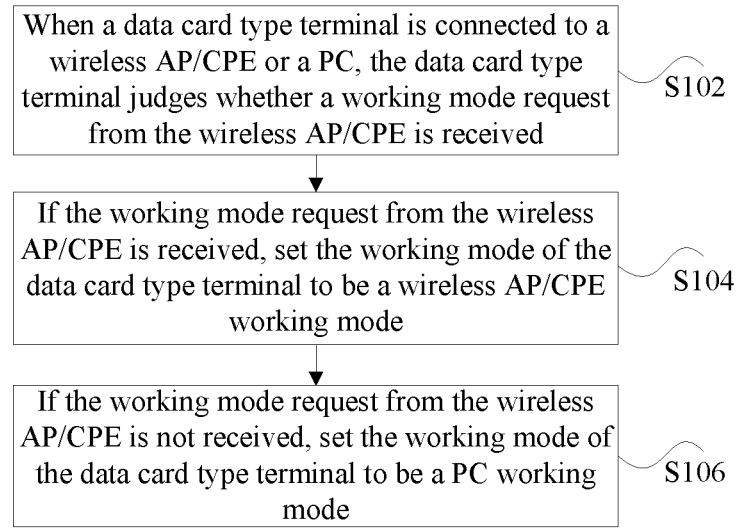
FIG. 1 is a flow chart of a method for determining a working mode of a data card type terminal according to an embodiment of the disclosure.

An embodiment of the disclosure provides a method for determining a working mode of a data card type terminal. FIG. 1 is a flow chart of the method for determining the working mode of the data card type terminal according to an embodiment of the disclosure. As shown in FIG. 1, the following steps S102 to S106 are included.

In step S102, when a data card type terminal is connected to a wireless AP/CPE or a PC, the data card type terminal judges whether a working mode request from the wireless AP/CPE is received.

In step S104, if the working mode request from the wireless AP/CPE is received, the working mode of the data card type terminal is set to be a wireless AP/CPE working mode.

In step S106, if the working mode request from the wireless AP/CPE is not received, the working mode of the data card type terminal is set to be a PC working mode.

In the related technologies, the data card type terminal is unable to automatically identify whether it is exchanging data with a PC or wireless CPE/AP type equipment, therefore the data card type terminal is unable to automatically adjust its working mode to work in a normal working state. In an embodiment of the disclosure, when a data card type terminal is connected to a wireless AP/CPE or PC, it is judged whether there is a working mode request from the wireless AP/CPE or not; if the working mode request from the wireless AP/CPE is received, the working mode of the data card type terminal is set to be an AP/CPE working mode; otherwise, the working mode of the data card type terminal is set to be a PC working mode. In this way, the data card type terminal is able to automatically adjust, through interaction with the PC or wireless AP/CPE equipment, the working mode according to different working environments without user's manual interference, i.e. a normal working state can be achieved.

After setting the working mode of the data card type terminal to be a wireless AP/CPE working mode, the following steps is further included. The data card type terminal reports a combination of ports used during cooperative work with the wireless AP/CPE to the wireless AP/CPE; and the data card type terminal receives a configuration management command from the wireless AP/CPE, and executes an operation corresponding to the configuration management command.

Before receiving, by the data card type terminal, a configuration management command from the wireless AP/CPE, the above-mentioned method further includes the following step: the wireless AP/CPE identifies the received combination of ports, and sends the configuration management command to the data card type terminal.

The above-mentioned combination of ports during cooperative work with the wireless AP/CPE includes: ECM, QMI, ECM+AT.

After setting the working mode of the data card type terminal to be a PC working mode, the following steps may further be included. The data card type terminal reports a combination of ports used during cooperative work with the PC to the PC; and the data card type terminal receives a configuration management command from the PC, and executes an operation corresponding to the configuration management command.

Before receiving, by the data card type terminal, a configuration management command from the PC, the above-mentioned method may further include the following step: the PC identifies the received combination of ports, and sends the configuration management command to the data card type terminal.

The above-mentioned combination of ports during cooperative work with the PC includes: RNDIS, NDIS+AT+Diagnostic.

In an example embodiment, the above-mentioned configuration management command includes: current network state query, APN setting, short message, connection, disconnection.

In an example embodiment, before judging, by the data card type terminal, whether a working mode request from the wireless AP/CPE is received, the above-mentioned method further includes the following step: the wireless AP/CPE detects connection with the data card type terminal; and the wireless AP/CPE sends the working mode request to the data card type terminal.

In an example embodiment, the above-mentioned working mode request may be a USB request.

Figure 2:
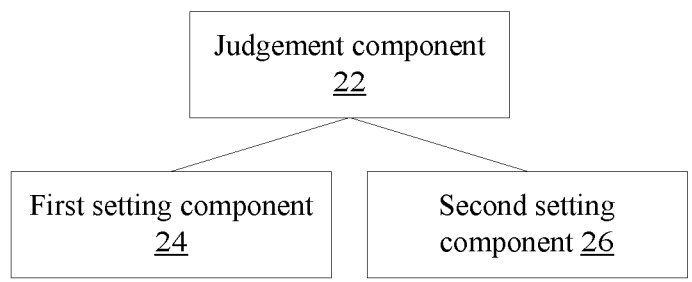
FIG. 2 is a structural block diagram of a device for determining a working mode of a data card type terminal according to an embodiment of the disclosure.

An embodiment of the disclosure further provides a device for determining the working mode of a data card type terminal, which is applied to a data card type terminal. This device for determining the working mode of a data card type terminal may be used for implementing the above-mentioned method for determining the working mode of a data card type terminal. FIG. 2 is a structural block diagram of the device for determining the working mode of a data card type terminal according to an embodiment of the disclosure. As shown in FIG. 2, the device includes a judgement component 22, a first setting component 24 and a second setting component 26. The structure thereof is described in details below.

The judgement component 22 is configured to judge, when a data card type terminal is connected to a wireless AP/CPE or a PC, whether a working mode request from the wireless AP/CPE is received; the first setting component 24 is coupled to the judgement component 22 and is configured to set, in the condition that a judgement result is that the working mode request from the wireless AP/CPE is received, the working mode of the data card type terminal to be a wireless AP/CPE working mode; and the second setting component 26 is coupled to the judgement component 22 and is configured to set, in the condition that the judgement result is that the working mode request from the wireless AP/CPE is not received, the working mode of the data card type terminal to be a PC working mode.

In the related technologies, the data card type terminal is unable to automatically identify whether it is exchanging data with a PC or wireless CPE/AP type equipment, the data card type terminal is unable to automatically adjust its working mode to work in a normal working state. In the embodiment of the disclosure, when a data card type terminal is connected to a wireless AP/CPE or PC, it is judged whether there is a working mode request from the wireless AP/CPE or not; if the working mode request from the wireless AP/CPE is received, the working mode of the data card type terminal is set to be an AP/CPE working mode; otherwise, the working mode of the data card type terminal is set to be a PC working mode. By virtue of this solution, the data card type terminal is able to automatically adjust, through interaction with the PC or wireless AP/CPE equipment, the working mode according to different working environments without user's manual interference, i.e. a normal working state can be achieved.

In an example embodiment, the above-mentioned device further includes: a report component configured to report, in the condition that the working mode of the data card type terminal is the wireless AP/CPE working mode, a combination of ports used during cooperative work with the wireless AP/CPE to the wireless AP/CPE, or to report, in the condition that the working mode of the data card type terminal is the PC working mode, a combination of ports used during cooperative work with the PC to the PC; a receiving component coupled to the report component and configured to receive a configuration management command from the wireless AP/CPE or the PC; and an execution component coupled to the receiving component and configured to execute an operation corresponding to the configuration management command received by the receiving component.

Figure 3:
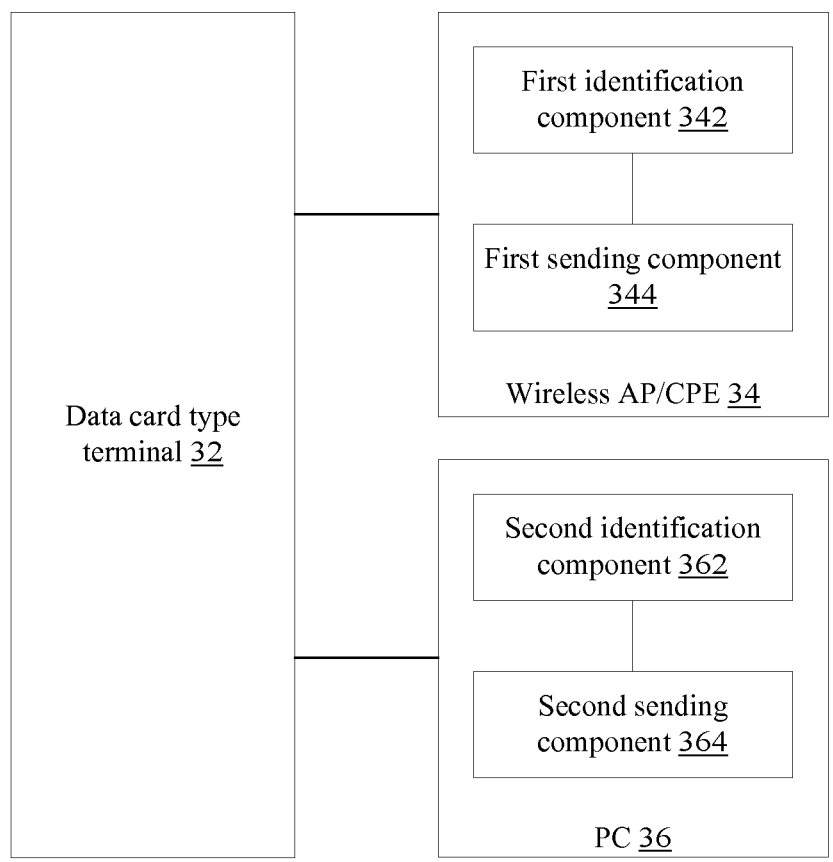
FIG. 3 is a structural block diagram of a system for determining a working mode of a data card type terminal according to an embodiment of the disclosure.

An embodiment of the disclosure further provide a system for determining the working mode of a data card type terminal, wherein the system may be used for implementing the above-mentioned method for determining the working mode of a data card type terminal. FIG. 3 is a structural block diagram of the system for determining the working mode of a data card type terminal according to an embodiment of the disclosure. As shown in FIG. 3, the system includes a data card type terminal 32, and a wireless AP/CPE 34 or a PC 36.

The data card type terminal 32 includes the above-mentioned device for determining the working mode of a data card type terminal; the wireless AP/CPE 34 which is coupled to the data card type terminal 32 includes: a first identification component 342 configured to identify received combination of ports; and a first sending component 344 coupled to the first identification component 342 and configured to send a configuration management command to the data card type terminal; and the PC 36 which is coupled to the data card type terminal 32 includes: a second identification component 362 configured to identify received combination of ports; and a second sending component 364 coupled to the second identification component 362 and configured to send a configuration management command to the data card type terminal.

Figure 4:
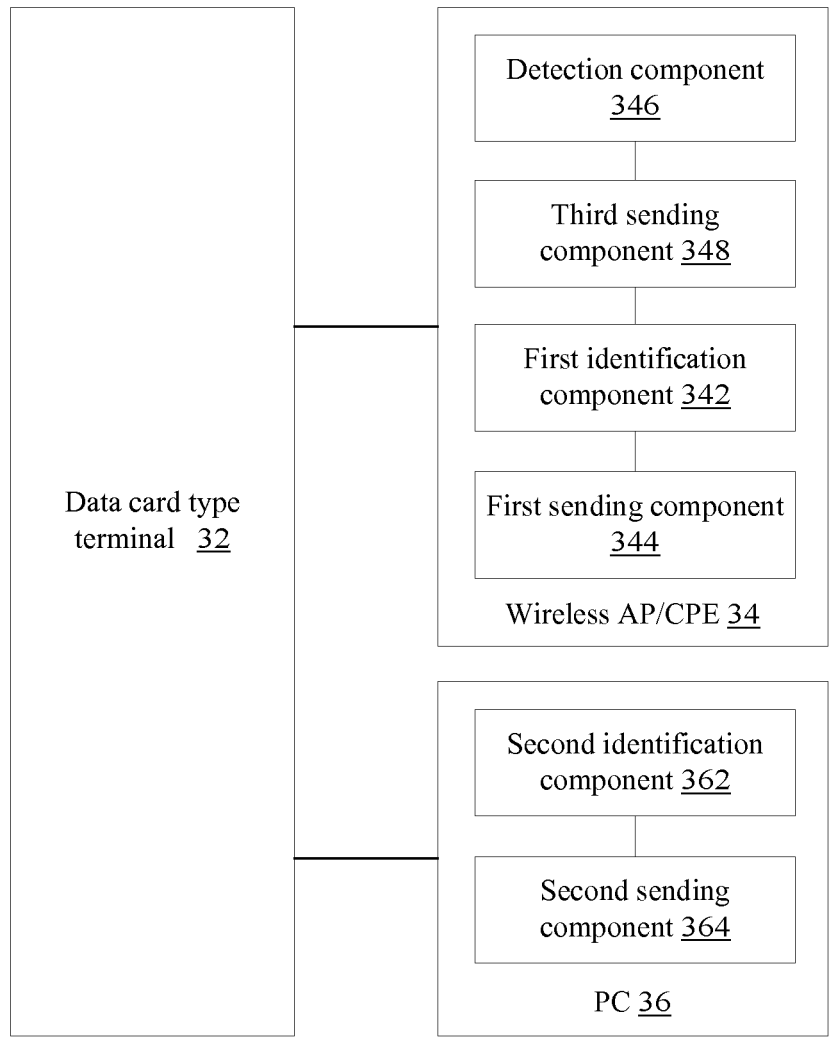
FIG. 4 is a structural block diagram of the system for determining the working mode of a data card type terminal according to an example embodiment of the disclosure.

As shown in FIG. 4, the above-mentioned wireless AP/CPE 34 may further include: a detection component 346 configured to detect connection with the data card type terminal; and a third sending component 348 coupled to the detection component 346 and configured to send a working mode request to the data card type terminal.

It should be noted that the device and system for determining the working mode of a data card type terminal described in the device embodiments correspond to the above-mentioned method embodiments, with the specific implementation described in the method embodiment in detail, thereby needing no further description.

According to the above-mentioned description of the technical solutions of the embodiments of the disclosure, it can be seen that the data card type terminal in the above-mentioned embodiments supports a PC working mode and a wireless AP/CPE working mode, and the data card is able to complete the adjustment of the working mode according to different working environments without user's manual interference. As an example implementation, by inserting an LTE data card into wireless AP/CPE type equipment which only supports 3G, the rate of exterior access of the wireless AP/CPE can be improved. The above-mentioned data card includes two kinds of product modalities, i.e. a drive free data card and a non-drive free data card, which support a PC user interface (PCUI) and a web user interface (Web UI).

In order to make the technical solutions and implementation methods of the embodiments of the disclosure more clear, the implementation process thereof will be described in detail below in conjunction with an example embodiment.

Figure 5:
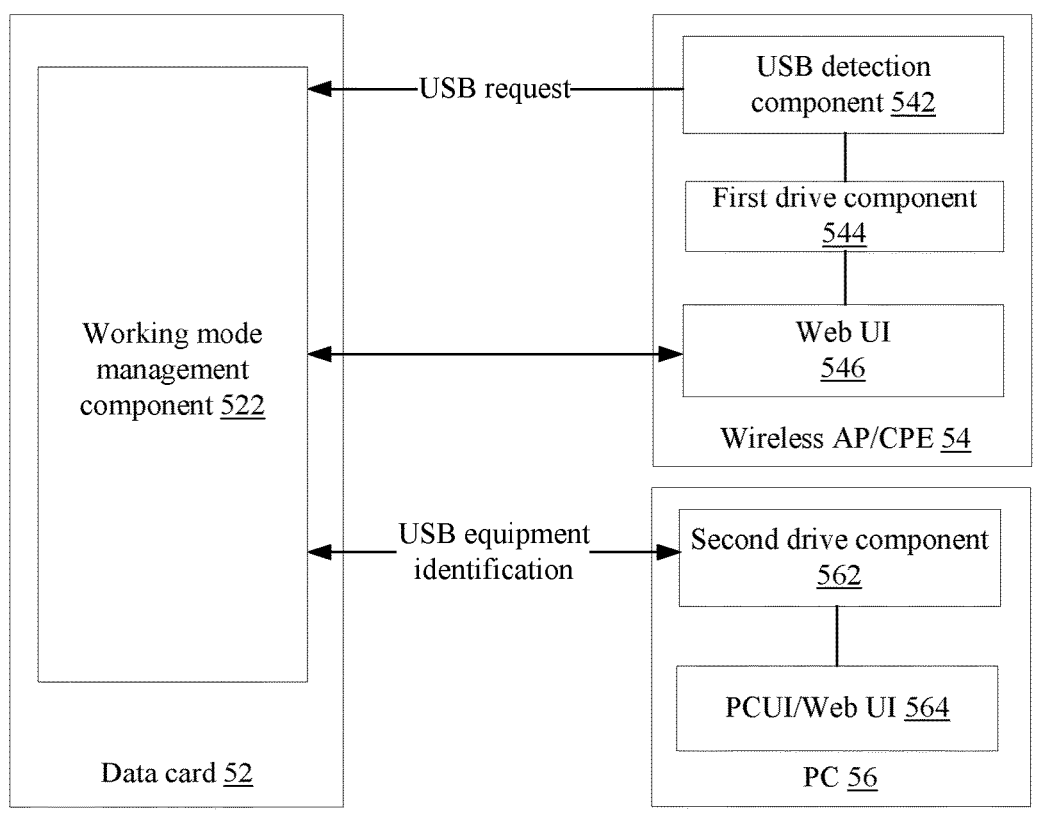
FIG. 5 is a structural schematic diagram of the system for determining the working mode of a data card type terminal according to an example embodiment of the disclosure.

FIG. 5 is a structural schematic diagram of the system for determining the working mode of a data card type terminal according to an example embodiment of the disclosure. As shown in FIG. 5, the system includes: a data card 52, a wireless AP/CPE 54 and a PC 56.

The data card 52 (implementing the function of the above-mentioned data card type terminal 32) includes a working mode management component 522 (implementing the functions of the above-mentioned judgement component 22, first setting component 24 and second setting component 26). The working mode management component 522 is a built-in component of the data card 52, which is mainly configured to judge whether a USB request of the wireless AP/CPE 54 is received. If a USB request is received, the data card 52 switches to a wireless AP/CTE working mode and reports a required combination of ports; and if the USB request is not received, the data card reports a combination of ports used during cooperative work with the PC. In an example embodiment, the format of the above-mentioned USB request meets the requirements of chapter 9.5, USB 2.0 protocol regulations, the instruction length being 8 bytes.

The wireless AP/CPE 54 includes: a USB equipment detection component 542 (implementing the functions of the above-mentioned detection component 346 and third sending component 348) which is coupled to the working mode management component 522 and sends a specific USB request to the data card 52 when it detects that the USB data card is inserted, for the purpose of switching the data card 52 to the wireless AP/CPE working mode; a first drive component 544 (implementing the function of the above-mentioned first identification component 342) configured to identify the combination of ports reported by the data card; and a Web UI 546 (implementing the function of the above-mentioned first sending component 344) which is coupled to the first drive component 544 and the working mode management component 522 and, as a built-in Web UI in the wireless AP/CPE, is configured to send, to the data card 52, a configuration management command, i.e. a common data card management command such as current network state query, APN setting, short message, connection, disconnection function.

The PC 56 includes: a second drive component 562 (implementing the function of the above-mentioned second identification component 362) which is coupled to the working mode management component 522 and is configured to identify the combination of ports reported by the data card 52; and a PCUI/Web UI 564 (implementing the function of the above-mentioned second sending component 364) which is a UI installed on the PC, means a Web UI for a drive free data card, and sends a configuration management command to the data card by means of a QMI or AT instruction.

Figure 6:
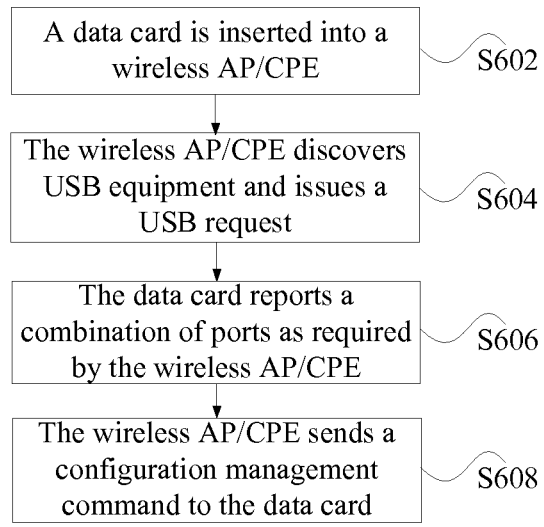
FIG. 6 is a flow chart showing the cooperative work between the wireless AP/CPE and the data card according to an example embodiment of the disclosure.

FIG. 6 is a flow chart showing the cooperative work between the wireless AP/CPE and the data card according to an example embodiment of the disclosure. As shown in FIG. 6, the steps S602 to S608 are included.

In step S602, the data card 52 is inserted into the wireless AP/CPE 54.

In step S604, the USB equipment detection component 542 in the wireless AP/CPE 54 detects the insertion of the data card 52 and sends a USB request to the data card 52.

In step S606, the data card 52 switches to the wireless AP/CPE working mode, and reports the combination of ports to the wireless AP/CPE 54 as required. The wireless AP has built-in drive which can correctly identify the reported combination of ports.

In step S608, the wireless AP/CPE 54 sends, to the data card 52, a configuration management command, i.e. a common management command such as current network state query, APN setting, short message, connection, disconnection function.

Figure 7:
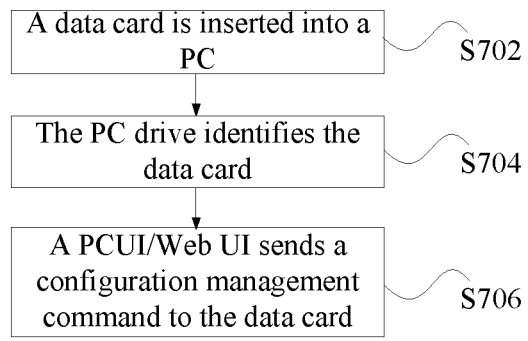
FIG. 7 is a flow chart showing the cooperative work between the PC and the data card according to an example embodiment of the disclosure.

FIG. 7 is a flow chart showing the cooperative work between the PC and the data card according to an example embodiment of the disclosure. As shown in FIG. 7, the steps S702 to S706 are included.

In step S702, the data card 52 is inserted into the PC 56.

In step S704, the data card 52 reports the combination of ports and the PC 56 drives to identify the ports.

In step S706: the user sends a configuration management command to the data card 52 via the PCUI/Web UI 564. The data card 52 executes a corresponding operation.

It should be noted that the steps shown in the flowchart of the drawings can be executed, for example, in a computer system with a set of instructions executable by a computer, in addition, a logic order is shown in the flowchart, but the shown or described steps can be executed in a different order under some conditions.

In summary, according to the above-mentioned embodiments of the disclosure, provided are a method, device and system for determining the working mode of a data card type terminal. By means of the embodiments of the disclosure, when a data card type terminal is connected to a wireless AP/CPE or PC, it is judged whether there is a working mode request from the wireless AP/CPE or not; if the working mode request from the wireless AP/CPE is received, the working mode of the data card type terminal is set to be an AP/CPE working mode; otherwise, the working mode of the data card type terminal is set to be a PC working mode. In this way, the data card type terminal is able to automatically adjust, through interaction with the PC or wireless AP/CPE equipment, the working mode according to different working environments without user's manual interference, i.e. a normal working state can be achieved.

Obviously, those skilled in the art shall understand that the above-mentioned components and steps of the disclosure can be realized by using general purpose calculating device, can be integrated in one calculating device or distributed on a network which consists of a plurality of calculating devices. Alternatively, the components and the steps of the disclosure can be realized by using the executable program code of the calculating device. Consequently, they can be stored in the storing device and executed by the calculating device, or they are made into integrated circuit component respectively, or a plurality of components or steps thereof are made into one integrated circuit component. In this way, the disclosure is not restricted to any particular hardware and software combination.

The descriptions above are only the example embodiments of the disclosure, which are not used to restrict the disclosure, for those skilled in the art, the disclosure may have various changes and variations. Any amendments, equivalent substitutions, improvements, etc. within the principle of the disclosure are all included in the scope of the protection as defined by the appended claims of the disclosure.

What is claimed is:

1. A method for determining a working mode of a data card type terminal, comprising:
when a data card type terminal is connected to a wireless access point (AP)/customer premise equipment (CPE) or a personal computer (PC), judging, by the data card type terminal, whether a working mode request from the wireless AP/CPE is received;
if the working mode request from the wireless AP/CPE is received, setting the working mode of the data card type terminal to be a wireless AP/CPE working mode; and
if the working mode request from the wireless AP/CPE is not received, setting the working mode of the data card type terminal to be a PC working mode;
wherein after setting the working mode of the data card type terminal to be the wireless AP/CPE working mode, the method further comprises: reporting, by the data card type terminal, to the wireless AP/CPE a combination of ports used during cooperative work with the wireless AP/CPE; and receiving, by the data card type terminal, a configuration management command from the wireless AP/CPE, and executing, by the data card type terminal, an operation corresponding to the configuration management command.

2. The method according to claim 1, wherein before receiving, by the data card type terminal, the configuration management command from the wireless AP/CPE, the method further comprises:
identifying, by the wireless AP/CPE, the received combination of ports; and
sending, by the wireless AP/CPE, the configuration management command to the data card type terminal.

3. The method according to claim 2, wherein before judging, by the data card type terminal, whether the working mode request from the wireless AP/CPE is received, the method further comprises:
detecting, by the wireless AP/CPE, connection with the data card type terminal; and
sending, by the wireless AP/CPE, the working mode request to the data card type terminal.

4. The method according to claim 1, wherein the combination of ports used during cooperative work with the wireless AP/CPE comprises: an Ethernet control model (EMC) interface, a Qualcomm modem interface (QMI), an ECM+AT.

5. The method according to claim 4, wherein before judging, by the data card type terminal, whether the working mode request from the wireless AP/CPE is received, the method further comprises:
detecting, by the wireless AP/CPE, connection with the data card type terminal; and
sending, by the wireless AP/CPE, the working mode request to the data card type terminal.

6. The method according to claim 1, wherein after setting the working mode of the data card type terminal to be the PC working mode, the method further comprises:
reporting, by the data card type terminal, to the PC a combination of ports used during cooperative work with the PC; and
receiving, by the data card type terminal, a configuration management command from the PC, and executing, by the data card type terminal, an operation corresponding to the configuration management command.

7. The method according to claim 6, wherein before receiving, by the data card type terminal, the configuration management command from the PC, the method further comprises:
identifying, by the PC, the received combination of ports; and
sending, by the PC, the configuration management command to the data card type terminal.

8. The method according to claim 6, wherein the combination of ports used during cooperative work with the PC comprises: a remote network driver interface specification (RNDIS), a network drive interface specification (NDIS)+AT+Diagnostic.

9. The method according to claim 6, wherein the configuration management command comprises: current network state query, access point name (APN) setting, short message, connection, disconnection.

10. The method according to claim 1, wherein the configuration management command comprises: current network state query, access point name (APN) setting, short message, connection, disconnection.

11. The method according to claim 1, wherein before judging, by the data card type terminal, whether the working mode request from the wireless AP/CPE is received, the method further comprises:
detecting, by the wireless AP/CPE, connection with the data card type terminal; and
sending, by the wireless AP/CPE, the working mode request to the data card type terminal.

12. The method according to claim 1, wherein the working mode request is a universal serial bus (USB) request.

13. The method according to claim 1, wherein before judging, by the data card type terminal, whether the working mode request from the wireless AP/CPE is received, the method further comprises:
detecting, by the wireless AP/CPE, connection with the data card type terminal; and
sending, by the wireless AP/CPE, the working mode request to the data card type terminal.

14. A device for determining a working mode of a data card type terminal, which is applied to a data card type terminal, wherein the device for determining the working mode of the data card type terminal comprises:
a judgement component configured to judge, when a data card type terminal is connected to a wireless access point (AP)/customer premise equipment (CPE) or a personal computer (PC), whether a working mode request from the wireless AP/CPE is received;
a first setting component configured to set, in a condition that a judgement result is that the working mode request from the wireless AP/CPE is received, the working mode of the data card type terminal to be a wireless AP/CPE working mode; and
a second setting component configured to set, in a condition that the judgement result is that the working mode request from the wireless AP/CPE is not received, the working mode of the data card type terminal to be a PC working mode;
a report component configured to report, in a condition that the working mode of the data card type terminal is the wireless AP/CPE working mode, a combination of ports used during cooperative work with the wireless AP/CPE to the wireless AP/CPE, or to report, in a condition that the working mode of the data card type terminal is the PC working mode, a combination of ports used during cooperative work with the PC to the PC;

a receiving component configured to receive a configuration management command from the wireless AP/CPE or the PC; and an execution component configured to execute an operation corresponding to the configuration management command.

15. A system for determining a working mode of a data card type terminal, comprising: a data card type terminal, a wireless access point (AP)/customer premise equipment (CPE) or a personal computer (PC), wherein the data card type terminal comprises the device for determining the working mode of the data card type terminal as claimed in claim 14;

the wireless AP/CPE comprises:

a first identification component configured to identify received combination of ports; and a first sending component configured to send a configuration management command to the data card type terminal; and the PC comprises:

a second identification component configured to identify received combination of ports; and a second sending component configured to send a configuration management command to the data card type terminal.

16. The system according to claim 15, wherein the wireless AP/CPE further comprises:

a detection component configured to detect connection with the data card type terminal; and a third sending component configured to send a working mode request to the data card type terminal.

* * * * *